(12) United States Patent
Pellettier

(10) Patent No.: US 11,857,093 B2
(45) Date of Patent: Jan. 2, 2024

(54) FOOD SERVICE APPARATUS AND METHOD

(71) Applicant: Russ L Pellettier, Middletown, CT (US)

(72) Inventor: Russ L Pellettier, Middletown, CT (US)

(*) Notice: Subject to any disclaimer, the term of this patent is extended or adjusted under 35 U.S.C. 154(b) by 675 days.

(21) Appl. No.: 16/101,910

(22) Filed: Aug. 13, 2018

(65) Prior Publication Data

US 2019/0045953 A1   Feb. 14, 2019

Related U.S. Application Data

(60) Provisional application No. 62/544,351, filed on Aug. 11, 2017.

(51) Int. Cl.
*A47G 19/08* (2006.01)
*A47J 47/14* (2006.01)

(52) U.S. Cl.
CPC .............. *A47G 19/08* (2013.01); *A47J 47/14* (2013.01)

(58) Field of Classification Search
CPC .................................. A47J 47/14; A47G 19/08
See application file for complete search history.

(56) References Cited

U.S. PATENT DOCUMENTS

| | | | |
|---|---|---|---|
| 2,564,571 A | 8/1951 | Havens | |
| 3,504,832 A | 4/1970 | Corvetti | |
| 4,448,313 A | 5/1984 | Pomeroy et al. | |
| 5,062,674 A | 11/1991 | Magee | |
| 6,240,565 B1 | 6/2001 | Spear | |
| 6,702,166 B1 | 3/2004 | Niemivuo et al. | |
| 8,292,342 B2 | 10/2012 | Lord | |
| 9,986,858 B1* | 6/2018 | Sedano | A47G 19/08 |
| 2009/0195005 A1* | 8/2009 | Lord | A47G 19/08 294/161 |
| 2018/0220823 A1* | 8/2018 | Lawhon | A47G 23/03 |

FOREIGN PATENT DOCUMENTS

| | | |
|---|---|---|
| CN | 201948698 U | 3/2011 |
| WO | WO2011128323 | 10/2011 |

* cited by examiner

*Primary Examiner* — Dana Ross
*Assistant Examiner* — Kuangyue Chen
(74) *Attorney, Agent, or Firm* — Robert S. Smith

(57) ABSTRACT

Apparatus for carrying a plurality of food service plates that each carry food thereon which includes an elongated body having a geometric axis and first and second axial extremities; a plurality of slots dimensioned and configured for engaging peripheral parts of respective plates at axially spaced intervals of the body in mutually parallel oblique relationship with respect to the geometric axis; and a handle disposed at one axial extremity and a nose at a second axial extremity.

17 Claims, 4 Drawing Sheets

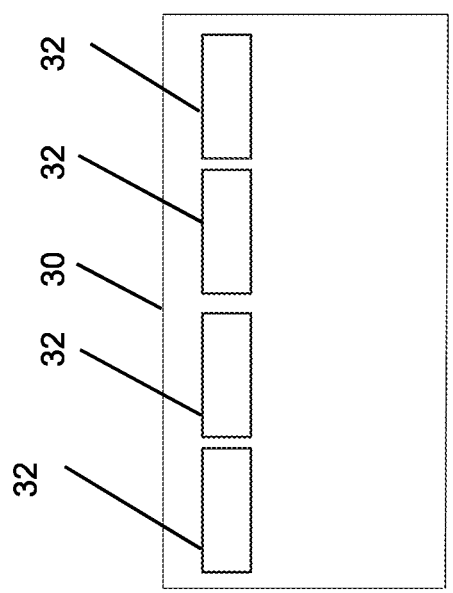

FOOD SERVICE APPARATUS AND METHOD

CROSS-REFERENCE TO RELATED APPLICATIONS

This application relies on the priority of provisional US provisional patent application entitled "FOOD SERVICE APPARATUS AND METHOD" filed Aug. 11, 2017, and having application No. 62/544,351. That application is hereby incorporated in its entirety herein.

TECHNICAL FIELD

The present invention is generally directed to restaurant food service. More particularly, the present invention is directed to apparatus that enables a food service person to deliver multiple plates more efficiently and confidently as well as a cooperating system for orderly organization of individual servings destined for respective patrons at respective tables.

BACKGROUND OF THE INVENTION

Restaurant food service personnel deal with juggling multiple plates that must be carried from the kitchen to the appropriate table and patron. In addition, significant organizational problems occur in the kitchen with respect to multiple dishes for multiple patrons at multiple tables in a working environment that completes preparation of individual dishes in a timeline that creates organizational issues.

From the above, it is therefore seen that there exists a need in the art to overcome the deficiencies and limitations described herein and above.

SUMMARY OF THE INVENTION

Accordingly, it is an object of the present invention to provide apparatus which will enable food servers to easily carry more plates and/or glasses including stemware either to or from patrons of a restaurant.

It is another object of the present invention to expedite the movement of food delivery services as well as removal of dirty plates from a restaurant table thereby resulting in greater customer satisfaction as well as better utilization of the restaurant facility.

It is yet another object of the present invention to provide apparatus which will minimize the risk a contamination of food being served because of food servers carrying the food along their arm in a manner which may be touched by unsanitary surfaces.

Another object of the present invention is to minimize food spills and breakage of glassware and tableware and/or server burns from hot plates which results in delayed service to the customer, destruction of prepared foods, and expense to replace the glassware and/or tableware.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

It has now been found that these and other objects of the present invention may be achieved in apparatus for carrying a plurality of plates that each carry food thereon which includes an elongated body having a geometric axis and first and second axial extremities; a plurality of slots dimensioned and configured for engaging peripheral parts of respective plates at axially spaced intervals of the body in mutually parallel oblique relationship with respect to the geometric axis; and a handle disposed at one axial extremity and a nose at a second axial extremity.

In some embodiments the apparatus is dimensioned and configured to receive the handle in the hand attached to an arm of the user and the nose in the crook of the elbow of the same arm.

The handle may extend laterally with respect to the direction of elongation of the elongated body which may be rectilinear. The slots may be substantially horizontal when the handle is in the hand attached to an arm of a user and the nose is in the crook of the elbow of the same arm. Some embodiments have a nose is defined by the intersection of an arcuate wall and a planar wall. The planar wall may abut the forearm of the user during utilization.

Other embodiments include an elongated body and apparatus for engaging the body with the hand and crook of the elbow of a user's forearm; apparatus for releasably securing each of a plurality of associated dishes at axially spaced interval along the axial extent of the elongated body.

The present invention also includes a system for food organization in a restaurant which includes providing a plurality of apparatus as described above; positioning the plurality of apparatus proximate to a food preparation location; loading each individual apparatus with dishes for a designated table or customer as preparation of the individual dishes are completed; and carrying an individual apparatus to a designated table or customer when the entire order is completed for that table or customer.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 4 is a view of restaurant workstation illustrating a method of use.

DETAILED DESCRIPTION

Figure 1:
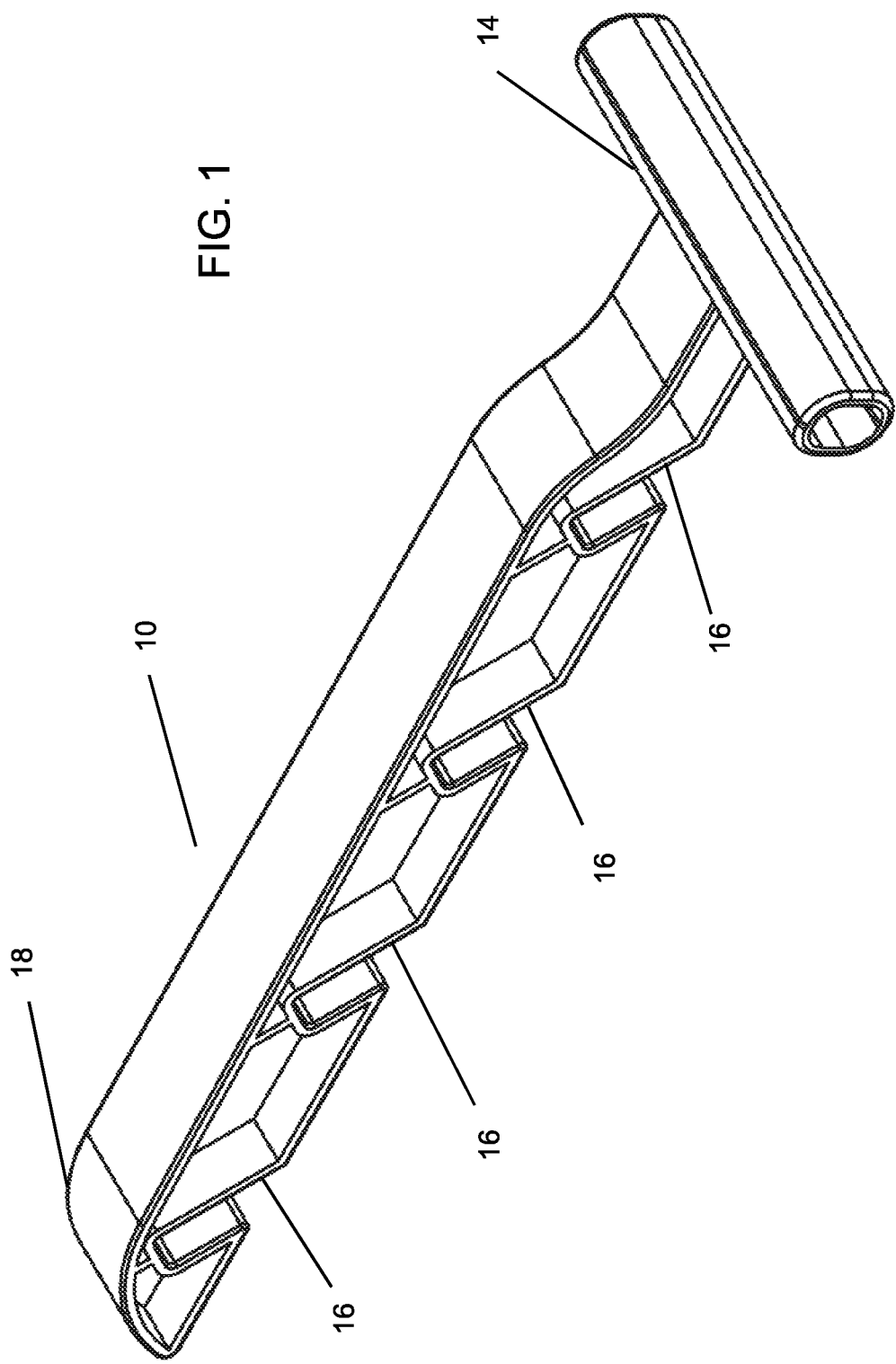
FIG. 1 is an isometric view of an embodiment of the apparatus in accordance with the present invention
Figure 2:
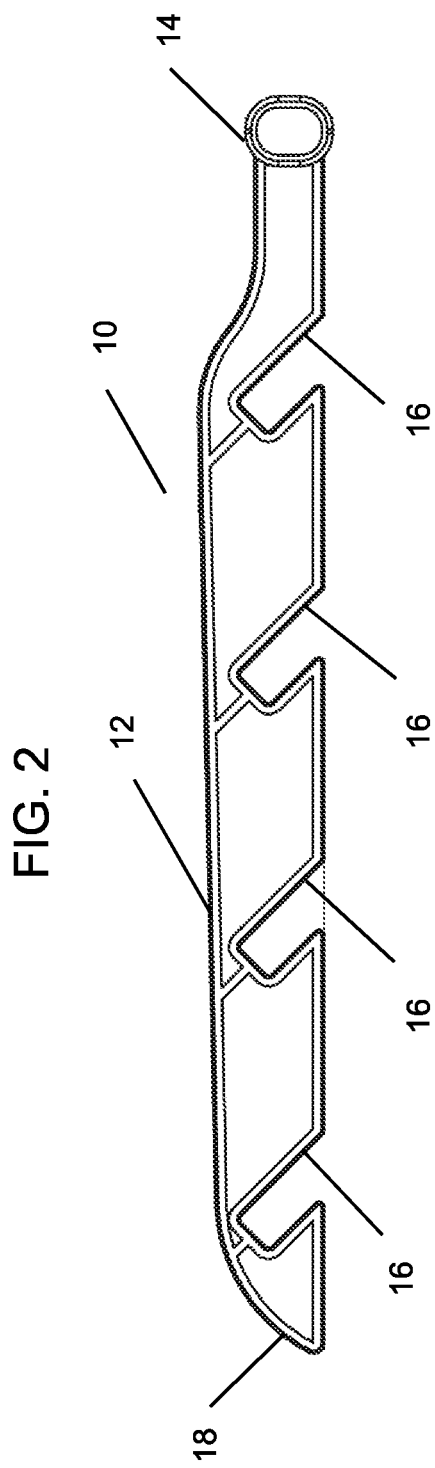
FIG. 2 is a side view of the apparatus illustrated in FIG. 1.

The present invention includes a holder apparatus 10 to enable a food server to easily hold and carry a plurality of plates with food disposed thereon. As shown in FIG. 1 and FIG. 2 of the drawing, a first embodiment of the present invention utilizes an elongated body 12 having a geometric axis (not shown). A plurality of slots 16, each dimension for engaging the periphery of a respective dish C, extend in oblique relationship to the geometric axis whereby a plurality of dishes C, that are carrying food thereon, may be simultaneously moved with great ease by a food server.

The holder 10 incorporates four slots 16. In this embodiment, the geometric axis of the body is substantially parallel to lowest part (as viewed in lowest part shown in FIG. 2). The slots 16 in the body 12 are disposed substantially at a 60 degree included angle with respect to the geometric axis of the body 12. The angle is generally selected to position the plates C in a substantially horizontal position when the plates C engage the slots, handle 14 of the holder 10 is being held by a hand, the side of the body of the holder is substantially abutting the forearm of the user whereby the forearm of the user supports the weight of the holder 10, the dishes C and the food (not shown) on the dishes.

Figure 3:
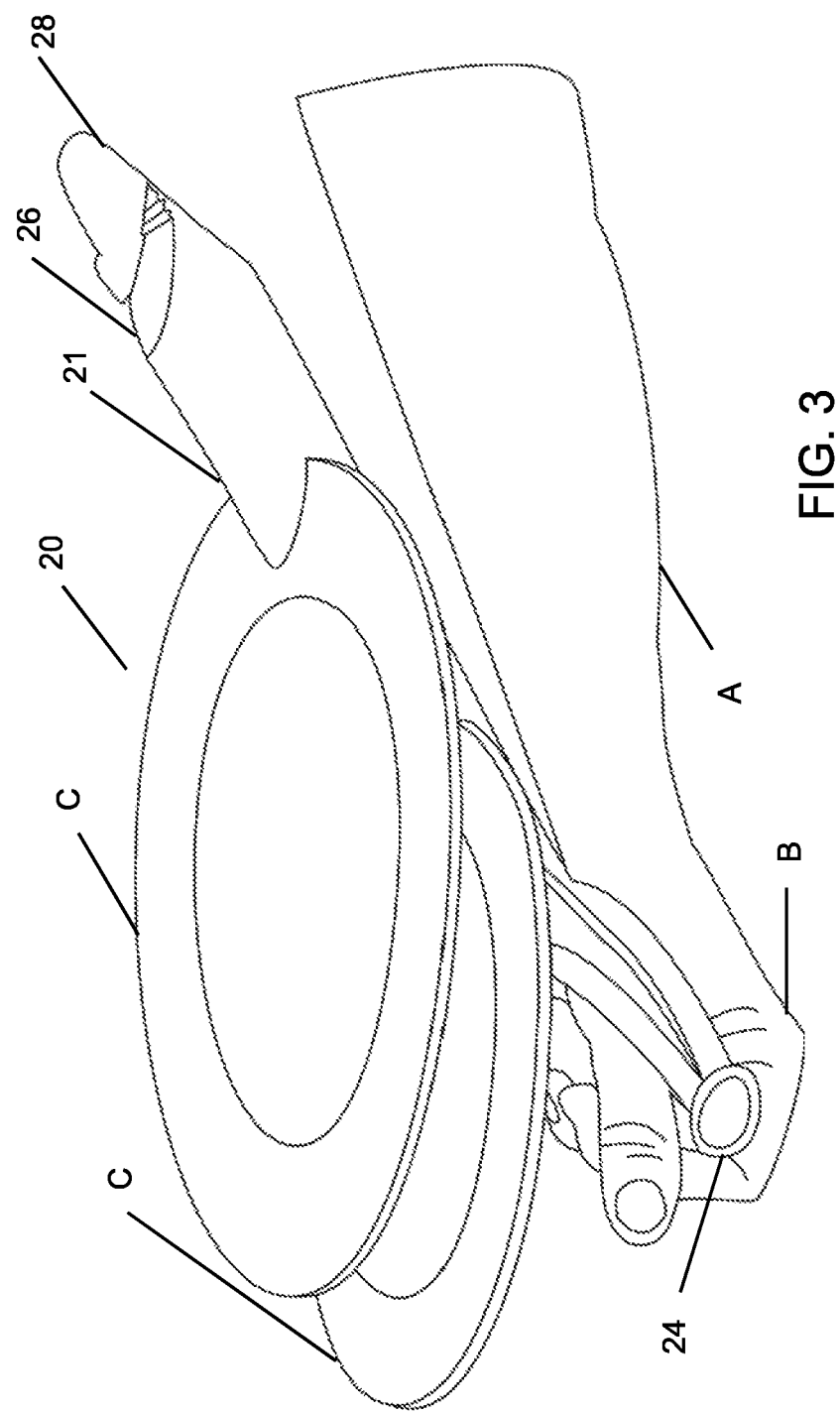
FIG. 3 is a view illustrating another embodiment of the apparatus in accordance with the present invention in operation being held by a person with 2 plates engaged with the apparatus.

A second embodiment of the present invention is shown in FIG. 3 in which a holder 20 includes an elongated body 21. The holder 20 is provided with slots 26 dimensioned and configured for receiving the edges of plates C. FIG. 3 better illustrates the manner of use of both the illustrated embodiments. As shown, the user extends his arm A and grasps the handle 24 of the apparatus 20. Preferably a nose 28 in the case of the holder 20 in FIG. 3 will nest comfortably in the crook of the user's arm to achieve maximum stability. The term "crook of the user's arm" will be understood to refer to the soft inside part of the arm when the elbow is bent. The holder 10 illustrated in FIG. 1 is provided with a nose 18, as best seen in FIG. 2 having abutting arcuate and planar sides. The shape of the nose 18 it is particularly advantageous to engage the crook of the user's arm for maximum stability.

In a typical form, the apparatus 10 has an overall length of about 14.50 inches, the slots 16 have opposed planar walls that are spaced apart 0.50 inches, and the handle 14 has a length of approximately 5 inches. The dimensions of embodiments will vary with the thickness of the plates used, the volume of the food typically placed on each plate, and the length of the forearm of the user.

From the above it will be seen that a wait staff member utilizing an embodiment of the present invention can dramatically reduce the number of trips required to transfer foods from a kitchen area to consumers seated at respective tables. Furthermore, the ability to carry multiple plates in a manner that does not contaminate the food by unintended touching of the prepared food, does not contaminate the clothing of the user (as when attempting to carry three or four plates in a manner that crowds the respective plates against the body of the wait staff person), and does not alter the chef's presentation due to inadvertent touching of the contents of individual plates is a substantial advantage. The reduction of trips leads to greater wait staff productivity, less wait staff fatigue, and customers that benefit from faster service, more sanitary food, and presentations that are not impaired incident to delivery to the customer's table. Happier customers are more likely to return and more likely to reward the waitstaff for their efforts.

Typically, waitstaff can pick up a single holder that is preloaded by kitchen staff with, for example, four respective servings for a given table. Upon delivery, waitstaff can secure the holder by a suitable hook (not shown) that engages, for example, the handle 14. A suitable hook is easily provided on a belt worn by the user. Accordingly, the waitstaff person then has his hands free to complete any other tasks necessary to assure the satisfaction of the customer.

The benefits achieved in organizing the delivery to a single table will be understood to be significant. However, still, further benefits can be achieved by the use of the apparatus in a method in accordance with the invention for organizing the delivery of all plates to all tables in a given restaurant.

Typically restaurant kitchens have an expediting area where the plates and dishes for respective customers at respective tables are assembled as preparation each individual dish is completed. Consider, for example, the complications involved in rationally organizing the prepared foods for 20 customers each of which has five dishes and the customers are sitting at 7 different tables. In the system, in accordance with the present invention, a plurality of apparatus in accordance with the present invention is positioned in an expediting location within the kitchen with respective apparatus designated for either a specific table or even a specific customer. Accordingly, as the individual dishes are completely prepared they are positioned in the designated apparatus for either a specific table or even a specific person. Thus, the server merely needs to pick up the loaded apparatus and carry it directly to the patron of the restaurant. Accordingly, the delivery to the customer is expedited and the probability of errors and delivery to the wrong customer is reduced.

Referring now to FIG. 4 there is shown a kitchen workstation 30 where a kitchen worker completes the placement of the respective foodstuffs on the individual customer's plates before delivery to the dining room tables. As an illustration of a particularly advantageous utilization of the apparatus described above and shown in FIGS. 1-3, the table is provided with a plurality of rectangular cross-section recesses 32. As an illustration of the concept, each rectangular recess 32 is dimensioned and configured for engagement with, for example, the handle 14 of one of the holders 10. Thus, kitchen staff can arrange, for example, all four plates for a given table on a single holder 10. For larger tables, more than one holder is designated for each table. Accordingly, the waitstaff can very rapidly make the required deliveries.

The workstation 30 illustrates only four recesses 32. It will be understood that a much larger number of recesses will be necessary to accommodate most restaurants. Typically, the array of mounting points for holders 10 may be disposed on a kitchen island or kitchen peninsular counter whereby (1) kitchen staff can access a first side of the arrayed holders 10 carried by recesses 32 or other mounting structure and (2) wait staff can access a second side of the arrayed holders 10.

Although the illustrated embodiments utilize a handle 14, 24 having a handgrip that extends laterally with respect to the axis of the body 12, 21 it will be understood that other embodiments may utilize a pistol grip. The pistol grip, as well as other handles, may include individual recesses for the food server's fingers to further enable gripping of the apparatus by the food server.

Some embodiments of the present invention may further include a clamp that is generally U-shaped and dimensioned and configured for gripping the edge of a table. In such embodiments, the server may use a clamp to temporarily position the apparatus on the edge of a table. More particularly, the apparatus may be loaded with respective plates or empty when so attached to a table. Thus, the food server can attach the apparatus to a table in the kitchen and load the apparatus with dishes full of food and then pick up the loaded apparatus and carry it to a table where the food server may attach the loaded apparatus to the dining room table while the food server removes individual plates from the apparatus.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Some embodiments of the apparatus include a hook apparatus to enable the server to carry the apparatus, when not in use, by engaging the hook with his or her belt or perhaps engaging the lower extremity of the pocket opening for the server's pant pocket.

Still, other embodiments of the present invention include a plurality of lateral extensions for accommodating stemware in addition to the plates. In most embodiments, lateral extensions will have crescent-shaped axial extremities to enable stemware to be slid into the crescent-shaped axial extremities. Typically, the lateral extensions will all be coplanar and the number of lateral extensions on each side of the geometric axis will be the same. Accordingly, when the apparatus is fully loaded with stemware the loaded apparatus will be easier to manipulate by the server because of the improved balance between the respective sides of the apparatus.

Alternative embodiments particularly suited, for example, a wine bar may exclude the slots for engaging plates.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component or method step is explicitly recited in the claims. No claim element herein is to be construed under the provisions of 35 U.S.C. 112, sixth paragraph, unless the element is expressly recited using the phrase "means for."

What is claimed is:

1. Apparatus for use by a restaurant waiter, to facilitate simultaneous transport of a plurality of plates that each carry food thereon which comprises:
    an elongated body having a geometric axis and first and second axial extremities;
    a plurality of slots sized for engaging peripheral parts of respective plates at axially spaced intervals of said elongated body, each slot of said plurality of slots being (1) being parallel to each other slot in said plurality of slots and (2) being disposed in oblique relation with respect to said geometric axis;
    a handle disposed at said first axial extremity and a nose at said second axial extremity and
    said elongated body is sized to extend between a hand and a crook of an elbow of an arm of a user;
    each slot of said plurality of slots being disposed to be substantially horizontal when both said first axial extremity is engaged by the associated waiter's hand and said second axial extremity is in the crook of the elbow of the same arm of the associated waiter; wherein each slot of said plurality of slots is defined by first and second parallel spaced apart planar, imperforate surfaces.

2. The apparatus as described in claim 1 wherein:
    said handle extends laterally with respect to the direction of elongation of said elongated body.

3. The apparatus as described in claim 1 wherein:
    said elongated body is rectilinear.

4. The apparatus as described in claim 1 wherein:
    each slot of said plurality of slots being disposed to be substantially horizontal when both said first axial extremity is engaged by the associated waiter's hand and said second axial extremity is in the crook of the elbow of the same arm of the associated waiter.

5. The apparatus as described in claim 1 wherein:
    said nose is defined by the intersection of an arcuate wall and a planar wall.

6. The apparatus as described in claim 5 wherein:
    said elongated body abuts the forearm of the waiter during utilization.

7. Apparatus for organizing the food preparations prepared by a restaurant kitchen and facilitating transport of multiple dishes of food preparations to respective restaurant patrons which comprises:
    a plurality of elongated bodies as described in claim 1;
    support apparatus for supporting each of the plurality of elongated bodies in spaced relationship whereby the plurality of elongated bodies are deployed at a work station whereby the food preparations prepared by the restaurant kitchen can be organized based on the intended destination and facilitation of transport of the multiple dishes of food preparations to respective restaurant patrons because the elongated bodies allow the simultaneous transport of multiple dishes.

8. The apparatus as described in claim 1 wherein said plurality of slots are sized for engaging peripheral parts of respective plates at uniform axially spaced intervals of said elongated body, of said elongated body each slot of said plurality of slots (1) being parallel to each other slot in said plurality of slots and (2) being disposed in oblique relation with respect to said geometric axis.

9. The apparatus as described in claim 1 wherein:
    said plurality of slots sized for engaging peripheral parts of respective plates at axially spaced intervals of said elongated body have
    each slot of said plurality of slots is disposed (1) parallel to each other slot in said plurality of slots and (2) disposed in oblique relation with respect to said geometric axis of said elongated body,
    and furthermore all slots of said plurality of slots are uniformly shaped and dimensioned.

10. The apparatus as described in claim 3 wherein all axial parts of said elongated body, having any one of said plurality of slots sized for engaging peripheral parts of respective plates at axially spaced intervals of said elongated body, have a uniform cross section;

each slot of said plurality of slots (1) being parallel to each other slot in said plurality of slots and (2) being disposed in oblique relation with respect to said geometric axis of said elongated body, and furthermore all slots of said plurality of slots are uniformly shaped and dimensioned.

11. The apparatus as described in claim 1 wherein said elongated body includes at least four slots.

12. The apparatus as described in claim 11 wherein said at least four slots are spaced along said axial extent of said elongated body and the cross sections of said elongated body intermediate:
   a. the first and second slots;
   b. the second and third slots; and
   c. the third and fourth slots
   are identical.

13. A method for facilitating the simultaneous transport of multiple food plates by a waiter having an arm having a hand and a crook of an elbow which comprises:
   providing an elongated body having a geometric axis and first and second axial extremities, the distance between the first and second axial extremities being sized to engage respectively the waiter's hand and crook of elbow;
   providing a plurality of slots sized for engaging peripheral parts of respective plates at a plurality of axially spaced intervals of said elongated body;
   providing each slot of said plurality of slots (1) to be parallel to each other slot in said plurality of slots and (2) to be disposed in oblique relation with respect to said geometric axis of said elongated body;
   providing all slots in said plurality of slots to be uniformly shaped and dimensioned; and
   providing a handle disposed at said first axial extremity of said elongated body and providing a nose at said second axial extremity of said elongated body; wherein each slot of said plurality of slots is defined by first and second parallel spaced apart planar, imperforate surfaces.

14. The method as described in claim 13 wherein said step of providing an elongated body having a geometric axis and first and second axial extremities, the distance between the first and second axial extremities being sized to engage respectively the waiter's hand and crook of elbow includes providing the elongated body having a rectilinear axis.

15. The method as described in claim 14 wherein:
   said step of providing a handle having a geometric axis and first and second axial extremities, the distance between the first and second axial extremities being sized to engage respectively the waiter's hand and crook of elbow;
   includes providing the handle that extends laterally with respect to said rectilinear axis and said elongated body is sized to extend intermediate the hand and crook of the elbow on the arm of the waiter.

16. The method as described in claim 13 wherein the step of providing a nose at the second axial extremity of said elongated body includes providing a nose defined by the intersection of an arcuate wall and a planar wall.

17. The method as described in claim 13 wherein the step providing a plurality of slots sized for engaging peripheral parts of respective plates at a plurality of axially spaced intervals of said elongated body in mutually parallel relationship and providing each slot in oblique relationship with respect to the geometric axis further includes providing all axial parts of the elongated body,
   in which any one of said slots in said plurality of slots are disposed having a uniform cross section;
   one of said plurality of slots dimensioned and configured for engaging peripheral parts of respective plates at axially spaced intervals of said elongated body;
   each slot of said plurality of slots (1) being parallel to each other slot in said plurality of slots and (2) being disposed in oblique relation with respect to said geometric axis of said elongated body,
   and furthermore all slots of said plurality of slots are uniformly shaped and dimensioned.

* * * * *